(12) United States Patent
Pirotais

(10) Patent No.: US 8,418,776 B2
(45) Date of Patent: Apr. 16, 2013

(54) IMPLEMENT CONTROL SYSTEMS

(75) Inventor: Jacques Pirotais, Glatigny (FR)

(73) Assignee: AGCO SA, Beauvais (FR)

( * ) Notice: Subject to any disclaimer, the term of this patent is extended or adjusted under 35 U.S.C. 154(b) by 25 days.

(21) Appl. No.: 12/745,643

(22) PCT Filed: Dec. 1, 2008

(86) PCT No.: PCT/EP2008/010170
§ 371 (c)(1),
(2), (4) Date: Jun. 1, 2010

(87) PCT Pub. No.: WO2009/071253
PCT Pub. Date: Jun. 11, 2009

(65) Prior Publication Data
US 2010/0300711 A1 Dec. 2, 2010

(30) Foreign Application Priority Data
Dec. 8, 2007 (GB) .................................. 0723993.2

(51) Int. Cl.
 *A01B 63/112* (2006.01)
(52) U.S. Cl.
 USPC .................................. 172/7; 172/2; 172/239
(58) Field of Classification Search .................. 172/2, 7, 172/4, 4.5, 9, 10, 12, 239
 See application file for complete search history.

(56) References Cited

U.S. PATENT DOCUMENTS

| | | | | |
|---|---|---|---|---|
| 2,701,508 A * | 2/1955 | Richey | ................................. | 172/7 |
| 2,701,733 A * | 2/1955 | Frevik et al. | ...................... | 403/37 |
| 2,981,341 A * | 4/1961 | Dilworth | ............................. | 172/2 |
| 3,825,072 A * | 7/1974 | Collins | ............................... | 172/7 |
| 4,519,623 A * | 5/1985 | Orthman | ........................ | 172/439 |
| 4,936,390 A * | 6/1990 | Anderson et al. | .................. | 172/5 |
| 5,810,096 A * | 9/1998 | Defrancq | ............................ | 172/2 |
| 5,911,769 A * | 6/1999 | Orbach et al. | .................... | 701/50 |
| 6,112,139 A * | 8/2000 | Schubert et al. | ................... | 701/2 |
| 6,119,786 A * | 9/2000 | Creger et al. | ...................... | 172/7 |
| 6,218,737 B1* | 4/2001 | Adamek et al. | ............... | 307/10.1 |
| 6,317,676 B1* | 11/2001 | Gengler et al. | ................. | 701/82 |
| 6,971,453 B2* | 12/2005 | Nordhoff | ........................ | 172/439 |
| 7,051,501 B2* | 5/2006 | Schlesser et al. | .............. | 56/15.2 |
| 7,174,966 B2* | 2/2007 | Ollefs | ................................ | 172/7 |
| 7,600,574 B2* | 10/2009 | Chauvel | ......................... | 172/439 |
| 7,658,234 B2* | 2/2010 | Brandt et al. | ...................... | 172/7 |
| 7,725,234 B2* | 5/2010 | Shull | ................................. | 701/50 |
| 7,739,015 B2* | 6/2010 | Senneff et al. | ................... | 701/50 |
| 7,954,556 B2* | 6/2011 | Hou et al. | ........................... | 172/7 |
| 8,083,004 B2* | 12/2011 | Knight, Jr. | .......................... | 172/7 |
| 2006/0016609 A1* | 1/2006 | Chauvel | ............................ | 172/7 |
| 2008/0264656 A1* | 10/2008 | Kapfer | ........................... | 172/439 |

* cited by examiner

Primary Examiner — Jamie L McGowan

(57) ABSTRACT

A control system for an implement (10) mounted on a tractor (11) via a three point linkage (10) and which has one or more depth control wheels (13) which contact the ground and which support at least part of the weight of the implement. The three point linkage has an upper link (17) and two lower links (14, 15), the upper link including an adjusting means such as an hydraulic cylinder (18) to vary its effective length and the lower links being provided with raising means (16) to raise the implement. The control system has a control unit (23) which received signals indicative of the level of slippage of one or more wheels of the tractor and which in response to a wheel slippage level above a first level (X) operates the adjusting means (18) to shorten the effective length of the upper link (17) to transfer some of the weight of the implement (10) onto the tractor to reduce wheel slippage. The control unit (23) also operates the lower link raising means (16) to raise the lower links (14,15) and hence the implement, if the wheel slippage level exceeds a second higher level (Z).

16 Claims, 1 Drawing Sheet

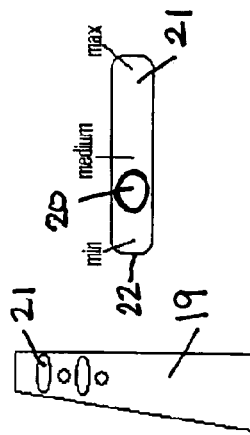
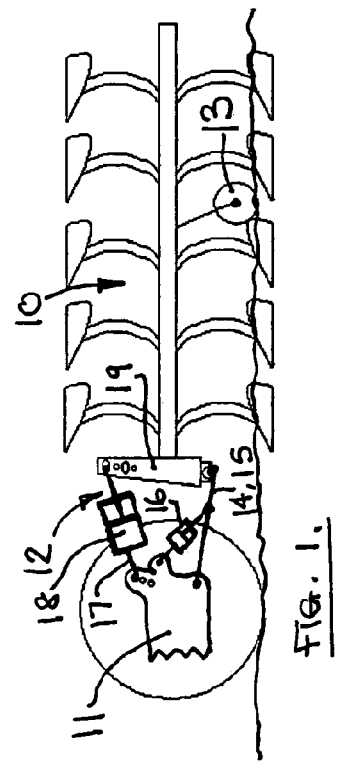
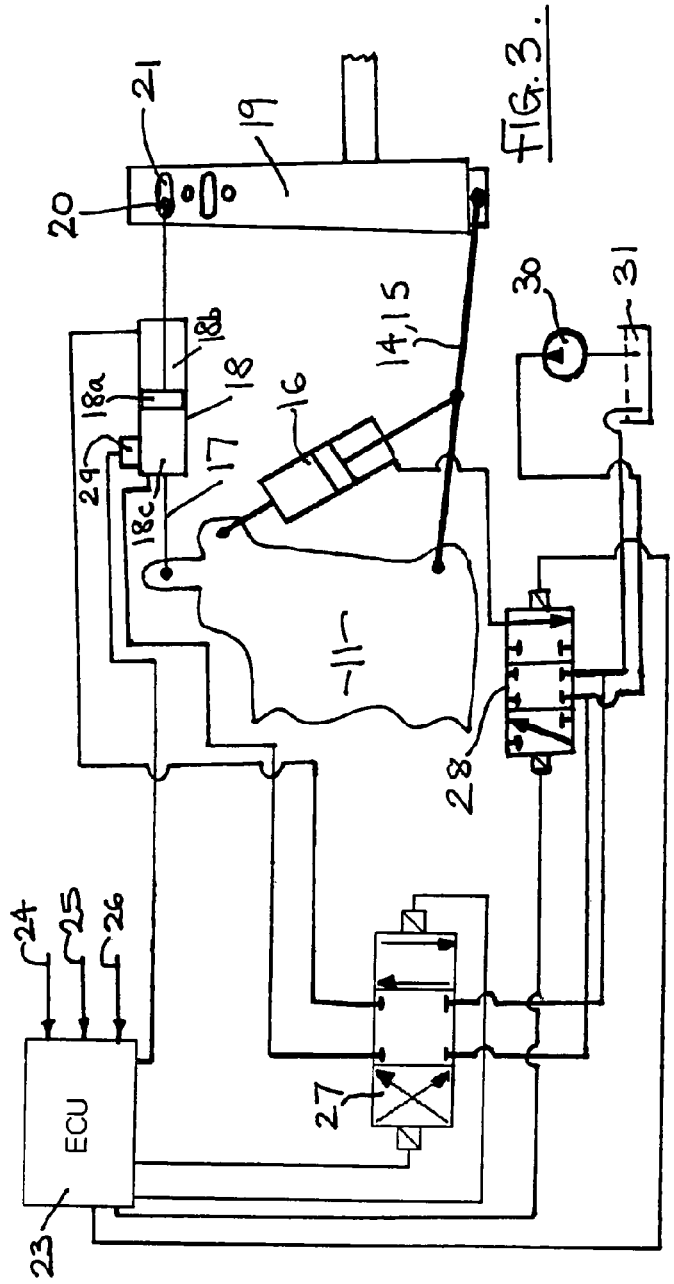

IMPLEMENT CONTROL SYSTEMS

This invention relates to implement control systems and in particular to implements which are attached to a tractor via a three-point linkage and which have one or more depth control wheels which contact the ground and which support at least part of the weight of the implement.

It is an object of the present invention to provide an improved form of implement control system which is particularly suitable for use with the above implements and which provides a more consistent control of the working depth of such implements dependent on the slippage of the wheels of the associated tractor.

This in accordance with the present invention there is provided a control system for an implement mounted on a tractor via a three point linkage and which has one or more death control wheels which contacts the ground and which support at least part of the weight of the implement, the three point linkage having an upper link and two lower links, the upper link including an adjusting means to vary its effective length and the lower links being provided with raising means to raise the implement, the control system having a control unit which received signals indicative of the level of slippage of one or more wheels of the tractor and which in response to a wheel slippage level operates the adjusting means to shorten the effective length of the upper link to transfer some of the weight of the implement onto the tractor to reduce wheel slippage, the control unit also operating the lower link raising means to raise the lower links, and hence the implement if the wheel slippage level exceeds a second higher level.

Such a control system provides a more consistent control of the working depth of the implement as the lower links are only raised, thus reducing the working depth of the whole implement, if the shortening of the length of the top link does not maintain the slippage rate below the second slippage level.

Preferably the adjusting means comprises a double acting hydraulic cylinder built into the top link.

The raising means also preferably comprises hydraulic cylinders for raising the lower links. In a preferred construction the top link is connected with the implement via an elongated slot and pin connection, the pin being located between the ends of the slot when no transfer of the weight of the implement is taking place and being in contact with one end of the slot when weight transfers occurs.

As an alternative to the above slot and pin connection the double acting cylinder may be arranged to be in a "float" condition when no transfer of the weight of the implement is taking place and may be hydraulically locked at a required length when weight transfers occurs.

One embodiment of the present invention will now be described, by way of example only, with reference to the accompanying drawings in which:—

FIG. 1 shows diagrammatically a plough with a depth control wheel secured to the rear of a tractor filled with an implement control system in accordance with the present invention;

FIG. 2 shows diagrammatically brief detail of the pin and slot connection between the plough and tractor of FIG. 1, and FIG. 3 shows diagrammatically details of the implement control system.

Referring to the drawings, a reversible semi-mounted plough 10 is mounted on the rear 11 of a tractor using a conventional three point linkage 12. The implement 10 has a depth wheel 13 which makes contact with the ground which provides the primary support for the weight of the implement.

The lower links 14 and 15 of the three point linkage 12 can be raised and lower relative to the tractor 11 using conventional hydraulic lift cylinders 16.

In accordance with the present invention, the upper link 17 of the three point linkage includes a double acting hydraulic cylinder 18 which is connected between the tractor 11 and the conventional vertical mounting post 19 of the implement.

As best seen in FIGS. 2 and 3, the upper link 17 is connected with the post 19 via a slot and pin connection which allows the implement to float relative to the tractor 11 when wheel slippage is at acceptable levels as a pin 20 carried by the link 17 moves along the slot 21 formed in post 19. If the pin 20 is drawn to the end 22 of the slot 21 by the cylinder 18, as will be described below, this enables part of the weight of the implement to be transferred on to the tractor.

The implement control system includes an electronic control unit 23 which controls the operation of the lift cylinders 16 and the double acting cylinder 18 which is built into the top link 17. The control unit 23 receives signals from the tractor representative of the slippage of the wheels of the tractor relative to the ground as indicated by arrow 24 by comparing, for example, the actual speed of rotation of one or more tractor wheels from wheel speed sensors (not shown) with the theoretical wheel speed derived from a radar unit (also not shown). The control unit 23 may also receive signals indicative of the draft force applied to the tractor via the implement as indicated by arrow 25 and the position of the implement as indicated by arrow 26 so that the control system can be operated in various modes of operation where draft force and/or implement position are controlling parameters.

In accordance with the implement control system of the present invention the position of the piston 18a of the hydraulic cylinder 18 is controlled by a solenoid operated valve 27 and the position of the draft links 14 and 15 is controlled by a further solenoid operated valve 28 which controls the flow of fluid into and out of the lift cylinders 16. A sensor 29 indicates the current effective length of upper link 17 to control unit 23. Valves 27 and 28 receive pressurised fluid from a pump 30 which is connected with a sump 31.

During use of the implement in accordance with the present invention, the control unit 23 is set up to operate in response to two pre-determined wheel slippage levels. If the wheel slippage level exceeds a first pre-determined level X, the hydraulic cylinder 18 is arranged to shorten the effective length of the top link by admitting pressurised fluid into chamber 18b of the cylinder and exhausting fluid from 18c via valve 27. This draws the pin 20 which is carried by the link 17 into contact with the end 22 of the slot 21 in the vertical post 19 of the implement which has the effect of transferring part of the weight of the implement on to the tractor 11 thus reducing wheel slippage. The lift cylinders 16 are only operated to raise the implement if the wheel slippage level rises above a second pre-determined level Z which is, for example, 5% higher than level X.

Thus when wheel slippage is less than the first level X the pin 20 moves in the slot 21 as the implement rises and falls through its contact with the ground through wheel 4. Only if the slippage level equals or raises above the level X does the system shorten the top link 17 using cylinder 18 to transfer part of the weight of the implement onto the trailer to reduce wheel slippage below level X. The lower links 14,15 are only raised using the lift cylinders 16 under the control of valve 28 if the slippage level exceeds Z. Level Z is set by the tractor operator between 0% and 99%. Most of the time level Z is set between 15% and 35%.

As will be appreciated such a control strategy provides a much more uniform depth of working of the implement.

In an alternative construction, the pin and slot connection between the upper link and the implement is replaced by arranging the cylinder 18 in the upper link to have a "float" condition in which fluid can move freely between chambers 18b and 18c when the level of wheel slippage is below the first level X. This float condition being switched out when the wheel slippage rises above level X so that the cylinder 18 can again shorten the length of link 17 to transfer part of the weight of the implement as described above.

Although the invention has been described above in relation to a trailed implement it will be appreciated that the control system could be used for implements with depth control wheels which are mounted on the front of a tractor by a suitable three-point front linkage.

The invention claimed is:

1. A control system for an implement mounted on a tractor via a three point linkage and which has one or more depth control wheels which contact the ground and which support at least part of the weight of the implement, the three point linkage having an upper link and two lower links, the upper link including an adjusting means to vary its effective length and the lower links being provided with raising means to raise the implement, the control system having a control unit which received signals indicative of the level of slippage of one or more wheels of the tractor and which in response to a wheel slippage level above a first level operates the adjusting means to shorten the effective length of the upper link to transfer some of the weight of the implement onto the tractor to reduce wheel slippage, the control unit also operating the lower link raising means to raise the lower links, and hence the implement, if the wheel slippage level exceeds a second higher level.

2. A control system according to claim 1 in which the adjusting means comprises a double acting hydraulic cylinder built into the top link.

3. A control system according to claim 1 in which the raising means comprises hydraulic cylinders for raising the lower links.

4. A control system according to claim 2 in which the top link is connected with the implement via an elongated slot and pin connection, the pin being located between the ends of the slot when no transfer of the weight of the implement is taking place and being in contact with one end of the slot when weight transfer occurs.

5. A control system according to claim 2 in which the double acting cylinder is in a "float" condition when no transfer of the weight of the implement is taking place and being hydraulically locked at a required length when weight transfers occurs.

6. A control system according to claim 1 in which the three point linkage is mounted on the rear of the tractor.

7. A control system according to claim 1 in which the three point linkage is mounted on the front of the tractor.

8. A control system according to claim 2 in which the raising means comprises hydraulic cylinders for raising the lower links.

9. A control system according to claim 2 in which the three point linkage is mounted on the rear of the tractor.

10. A control system according to claim 3 in which the three point linkage is mounted on the rear of the tractor.

11. A control system according to claim 4 in which the three point linkage is mounted on the rear of the tractor.

12. A control system according to claim 5 in which the three point linkage is mounted on the rear of the tractor.

13. A control system according to claim 2 in which the three point linkage is mounted on the front of the tractor.

14. A control system according to claim 3 in which the three point linkage is mounted on the front of the tractor.

15. A control system according to claim 4 in which the three point linkage is mounted on the front of the tractor.

16. A control system according to claim 5 in which the three point linkage is mounted on the front of the tractor.

* * * * *